United States Patent
Huang

(10) Patent No.: US 9,325,837 B2
(45) Date of Patent: Apr. 26, 2016

(54) MOBILE TERMINAL AND DANCE METHOD THEREOF

(75) Inventor: Zhulin Huang, Shenzhen (CN)

(73) Assignee: ZTE CORPORATION, Shenzhen, Guangdong (CN)

(*) Notice: Subject to any disclaimer, the term of this patent is extended or adjusted under 35 U.S.C. 154(b) by 0 days.

(21) Appl. No.: 14/381,305

(22) PCT Filed: May 16, 2012

(86) PCT No.: PCT/CN2012/075590
§ 371 (c)(1),
(2), (4) Date: Aug. 27, 2014

(87) PCT Pub. No.: WO2013/131322
PCT Pub. Date: Sep. 12, 2013

(65) Prior Publication Data
US 2015/0094122 A1    Apr. 2, 2015

(30) Foreign Application Priority Data

Mar. 6, 2012    (CN) .......................... 2012 1 0056187

(51) Int. Cl.
*H04B 1/38* (2015.01)
*H04M 1/00* (2006.01)
(Continued)

(52) U.S. Cl.
CPC ................. *H04M 3/02* (2013.01); *H02N 15/00* (2013.01); *H04M 1/04* (2013.01); *H04M 19/04* (2013.01)

(58) Field of Classification Search
CPC ......... H04M 3/02; H04M 1/04; H04M 19/04; H02N 15/00; H04B 5/0025
USPC .................................................. 455/567, 566
See application file for complete search history.

(56) References Cited

U.S. PATENT DOCUMENTS 6,888,940 B1 * 5/2005 Deppen ............... B60R 11/0241
                                                            379/446
8,558,497 B2 * 10/2013 Wright ..................... H03K 7/08
                                                            318/34
(Continued)

FOREIGN PATENT DOCUMENTS

| CN | 1182275 A | 5/1998 |
| CN | 101563922 A | 10/2009 |

(Continued)

OTHER PUBLICATIONS

Supplementary European Search Report in European application No. 12870783.3, mailed on May 28, 2015.
(Continued)

*Primary Examiner* — Qutbuddin Ghulamali
(74) *Attorney, Agent, or Firm* — Oppedahl Patent Law Firm LLC

(57) ABSTRACT

Disclosed is a mobile terminal dance method, where a first magnet is set at the bottom of a mobile terminal, the mobile terminal is placed in a base, and the base is set with a second magnet with a polarity opposite to a polarity of the first magnet; when a preset triggering condition is met, the mobile terminal sends a first control signal to control the polarity of the first magnet, such that the first magnet produces a polarity identical to the polarity of the second magnet. The disclosure further discloses a mobile terminal. With the mobile terminal and the dance method thereof as provided by the disclosure, a user may be provided with a brand new mode of prompting an incoming call, increasing user experience.

8 Claims, 4 Drawing Sheets

(51) Int. Cl.
*H04M 3/02* (2006.01)
*H04M 1/04* (2006.01)
*H02N 15/00* (2006.01)
*H04M 19/04* (2006.01)

(56) References Cited

U.S. PATENT DOCUMENTS

2005/0134215 A1\* 6/2005 Bozzone ............... H02J 7/0044
320/112
2010/0160005 A1 6/2010 Sip et al.

FOREIGN PATENT DOCUMENTS

| CN | 101753647 A | 6/2010 |
| EP | 0193664 A1 | 9/1986 |
| EP | 2381558 A2 | 10/2011 |
| JP | 2001053853 A | 2/2001 |
| WO | 2008058562 A1 | 5/2008 |

OTHER PUBLICATIONS

International Search Report in international application No. PCT/CN2012/075590, mailed on Dec. 13, 2012. (3 pages—see entire document).

English Translation of the Written Opinion of the International Search Authority in international application No. PCT/CN2012/075590, mailed on Dec. 13, 2012. (7 pages—see entire document).

\* cited by examiner

MOBILE TERMINAL AND DANCE METHOD THEREOF

TECHNICAL FIELD

The disclosure relates to the field of communication, and in particular to a mobile terminal and a dance method thereof.

BACKGROUND

Along with the booming market of mobile terminals such as smartphones, there is a notable issue of low consumer loyalty to an owned smartphone. Future smartphone manufacturers and operators have to create richer, more personalized application services to increase loyalty of an existing user to a product. With increasing public knowledge about smartphones, as well as high similarity among major smartphone products, a hardware feature of a smartphone will not surprise a consumer; what of more user interest are applications capable of increasing mobile equipment performance and personalized experience. When there is an incoming call, an existing mobile terminal prompts a user generally in a monotonic and stereotyped mode such as by ring, vibration or LED light, failing to provide better user experience.

SUMMARY

It is desired that embodiments of the disclosure provide a mobile terminal and a dance method thereof, capable of providing a user with a brand new mode of prompting an incoming call and increasing user experience.

The disclosure proposes a mobile terminal dance method, where a first magnet is set at the bottom of a mobile terminal, the mobile terminal is placed in a base, and the base is set with a second magnet with a polarity opposite to a polarity of the first magnet; the method includes a step of:

when a preset triggering condition is met, sending, by the mobile terminal, a first control signal to control the polarity of the first magnet, such that the first magnet produces a polarity identical to the polarity of the second magnet.

In an embodiment, the step of when a preset triggering condition is met, sending, by the mobile terminal, a first control signal to control the polarity of the first magnet, such that the first magnet produces a polarity identical to the polarity of the second magnet may include steps of:

when the preset triggering condition is met, acquiring a sampling frequency preset in the mobile terminal; and sending the first control signal to the first magnet, such that the first magnet produces the polarity identical to the polarity of the second magnet, where a frequency of the first control signal is the sampling frequency.

In an embodiment, the sampling frequency may be a sampling frequency of an incoming call ringtone of the mobile terminal or a flickering frequency of an incoming call LED light of the mobile terminal.

In an embodiment, the first control signal may further control a magnetic intensity of the first magnet.

In an embodiment, the method may further include a step of: while executing the step of sending, by the mobile terminal, a first control signal to control the polarity of the first magnet, triggering an incoming call ringtone of the mobile terminal and/or flickering of an incoming call LED light of the mobile terminal.

In an embodiment, the step of sending the first control signal to the first magnet may include:

sending the first control signal to drive a Pulse Width Modulation (PWM) wave to adjust the polarity of the first magnet.

The disclosure further provides a mobile terminal including a first magnet set at the bottom of the mobile terminal and a magnetic suspension control module, where the mobile terminal is placed in a base, the base is set with a second magnet with a polarity opposite to a polarity of the first magnet, and the magnetic suspension control module is configured for:

when a preset triggering condition is met, sending a first control signal to control the polarity of the first magnet, such that the first magnet produces a polarity identical to the polarity of the second magnet.

In an embodiment, the magnetic suspension control module may include:

an acquiring unit configured for: when the preset triggering condition is met, acquiring a sampling frequency preset in the mobile terminal; and a sending unit configured for: sending the first control signal to the first magnet, such that the first magnet produces the polarity identical to the polarity of the second magnet, where a frequency of the first control signal is the sampling frequency.

In an embodiment, the sampling frequency may be a sampling frequency of an incoming call ringtone of the mobile terminal or a flickering frequency of an incoming call LED light of the mobile terminal.

In an embodiment, the first control signal may further control a magnetic intensity of the first magnet.

In an embodiment, the magnetic suspension control module may further include a triggering unit configured for: triggering an incoming call ringtone of the mobile terminal and/or flickering of an incoming call LED light of the mobile terminal.

In an embodiment, the sending unit may be further configured for:

sending the first control signal to drive a Pulse Width Modulation (PWM) wave to adjust the polarity of the first magnet.

With the mobile terminal and the dance method thereof as provided by the disclosure, a high-tech maglev theory is integrated in an incoming call prompting application of a mobile terminal to replace a stereotyped monotonic prompt mode in a mobile terminal at present as an attempt to marry a physical theory and consumer electronics. A wireless charging feature is further covered via the base of the mobile terminal supporting the dance, ensuring the endurance capability of the mobile terminal. The disclosure stands for an application example of a perfect integration of the electromagnetic suspension theory in a mobile phone feature, bringing unprecedented user experience.

Implementation, features, characteristics, and advantages of the disclosure will be further described with reference to embodiments and drawings.

DETAILED DESCRIPTION

It should be understood that a specific embodiment illustrated herein is merely for explaining the disclosure, and is not intended to limit the disclosure.

According to a maglev theory, an electronically controlled bearing magnet is set at the bottom of each of both sides of a train, such that the train is sucked upwards to a stator at the bottom of a rail. A guiding magnet located at each of both sides of the train keeps the train separated from the rail by a certain lateral distance. By electronics, it may be ensured that there is always a constant space between a magnet on the train and the rail. With the maglev theory, a magnet is given an anti-gravity, namely, "magnetic suspension", capability essentially utilizing repulsion between magnetic poles of the same polarity and attraction between magnetic poles of opposite polarities.

A mobile terminal dance method according to an embodiment of the disclosure is proposed according to the magnetic suspension theory. A first magnet is set at the bottom of a mobile terminal. The magnetic polarity of the first magnet may be switched with an electrode change. The mobile terminal is placed in a base which, in an embodiment, may be a wireless base; the base is set with a second magnet with a polarity opposite to that of the first magnet. The base may be further set with a charging module configured for charging the mobile terminal when the mobile terminal receives no incoming call. The polarity of the second magnet may be fixed or unfixed.

When a preset triggering condition is met, the mobile terminal sends a first control signal to control the polarity of the first magnet, such that the first magnet produces a polarity identical to the polarity of the second magnet. The triggering condition according to the embodiment may be an incoming call, a calendar prompt, information access, or the like. The embodiment may be described with an example of an incoming call.

Figure 1:
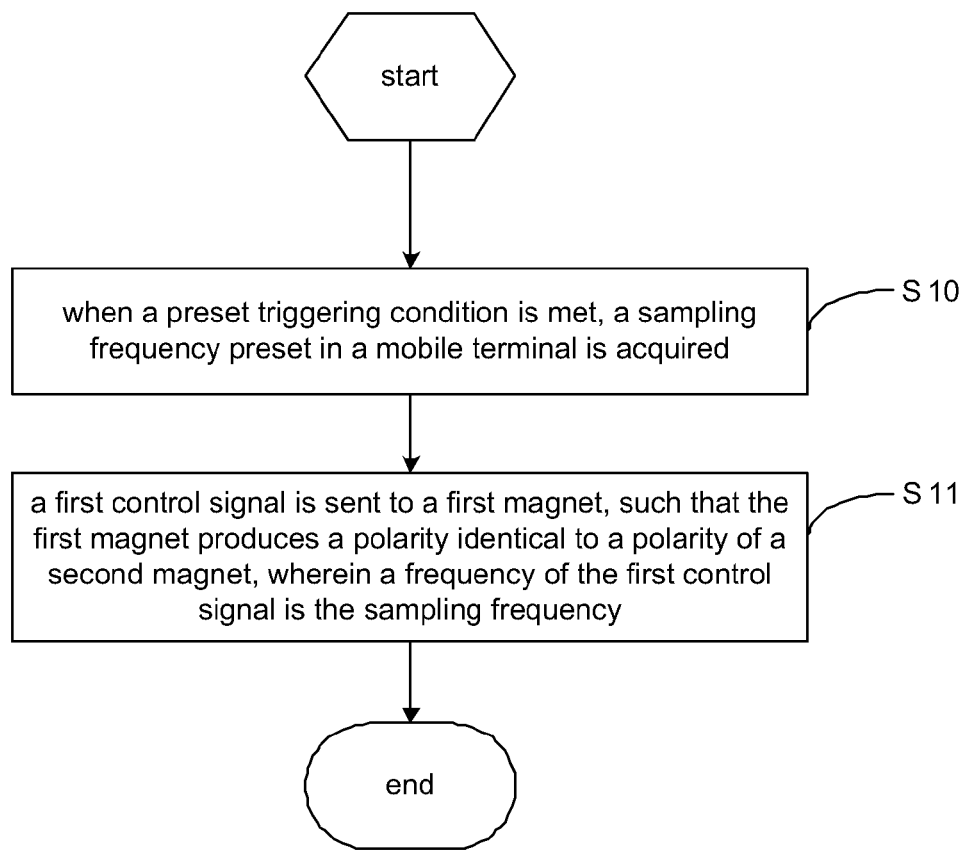
FIG. 1 is a flowchart of a mobile terminal dance method according to an embodiment of the disclosure.

Referring to FIG. 1, the method according to the embodiment may include steps as follows.

In S10, when a preset triggering condition is met, a sampling frequency preset in a mobile terminal is acquired, and detect a polarity of a second magnet;

When there is no incoming call, the mobile terminal may be placed in the base to stand on a desktop, in which case the mobile terminal stays securely in the base, as the first magnet of the mobile terminal is set to have a polarity opposite to that of the second magnet at the base, and magnetic poles of opposite polarities attract each other.

When there is an incoming call, the mobile terminal may acquire a locally preset sampling frequency, and produce the first control signal with a frequency identical to the sampling frequency to drive a PWM wave. The sampling frequency may be a sampling frequency of an incoming call ringtone of the mobile terminal or a flickering frequency of an incoming call LED light of the mobile terminal.

In S11, a first control signal is sent to a first magnet, such that the first magnet produces a polarity identical to a polarity of a second magnet, where a frequency of the first control signal is the sampling frequency.

The first control signal may change the polarity of the first magnet, causing the mobile terminal to power the first magnet such that the first magnet becomes an electromagnet with a polarity identical to that of the second magnet. Repulsion between magnetic poles of the same polarity will overcome the gravity of the mobile terminal, such that the mobile phone is held up and suspended.

The mobile terminal may adjust the magnetic strength of the first magnet using the PWM signal by varying the difference between the gravity of the mobile terminal and a magnetic force with the frequency of the PWM signal, such that the mobile terminal floats up and down and dances. Meanwhile, the mobile terminal may further trigger an incoming call ringtone and/or rhythmic flickering of an incoming call LED light of the mobile terminal, such that the mobile terminal appears to dance with the music and the light.

At the end of an incoming call of the mobile terminal, the mobile terminal may send a second control signal to remove the electrode of the first magnet and restore the original magnetic polarity of the first magnet opposite to the polarity at the base, such that the mobile terminal returns to the base correctly due to attraction between magnetic poles of opposite polarities.

Note that when the polarity of the second magnet is not fixed, the mobile terminal has to detect the polarity of the second magnet constantly to control the polarity of the first magnet according to the polarity of the second magnet, such that the first magnet has a polarity opposite to that of the second magnet when the triggering condition is not met, and has a polarity identical to that of the second magnet when the triggering condition is met, so as to achieve the dance.

The embodiment differs from a monotonic mode of prompting an incoming call by a ringtone, a vibration or a LED light in existing technology by increasing an interesting and personalized prompt by dance, thus achieving brand new user experience. With the embodiment, physical knowledge from different fields are combined; miniaturization and integration to a mobile terminal is achieved, which is an innovation comprehensively utilizing multiple disciplines. In addition, the base also serves for a feature of wireless charging of the mobile terminal, ensuring an endurance capability of the mobile terminal. The method is simple and easy to implement, and possesses great commercial values.

Figure 2:
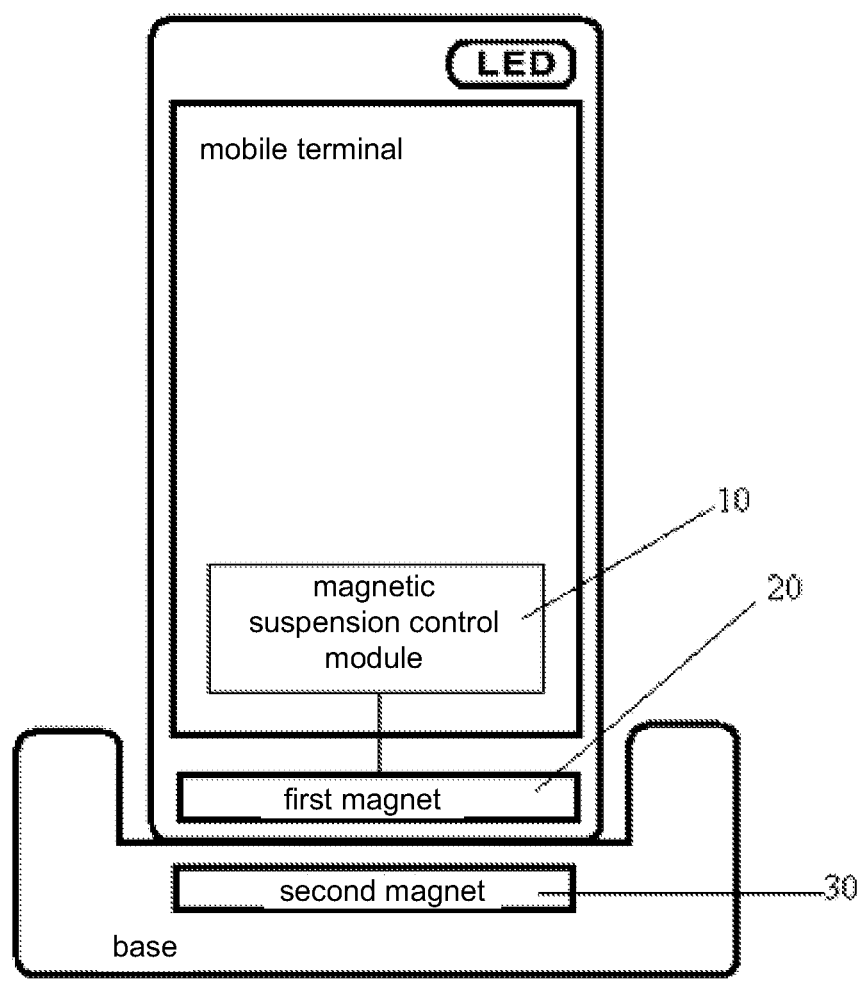
FIG. 2 is a schematic diagram of a structure of a mobile terminal according to an embodiment of the disclosure.

Referring to FIG. 2, a mobile terminal according to an embodiment of the disclosure is proposed. The mobile terminal according to the embodiment is configured with a corresponding base. The base is set with a second magnet 30, the polarity of which may be fixed or unfixed. In an embodiment, the base may be a wireless base. The base may serve both: 1) to allow the mobile terminal to stand on a desktop when the mobile terminal is not in use; and 2) to ensure the endurance capability of the mobile terminal in an incoming call dance by adopting popular charging technology in the current mobile phone design industry to meet power consumption required in the application.

The embodiment is distinct, in that a miniature magnetic suspension device and a magnetic suspension control module are designed on a mobile terminal. The key of the magnetic suspension device is a first magnet 20 set at the bottom of the mobile terminal. When the mobile terminal is still, the first magnet 20 has a polarity opposite to that of a second magnet 30 on the base. When the preset triggering condition is met, the magnetic suspension control module may control the polarity of the first magnet 20 by sending a first control signal using a core processor of the mobile terminal, such that the polarity produced by the first magnet 20 is identical to that of the second magnet 30. The triggering condition according to the embodiment may be an incoming call, a calendar prompt, information access, or the like. The embodiment may be described with an example of an incoming call.

Figure 3:
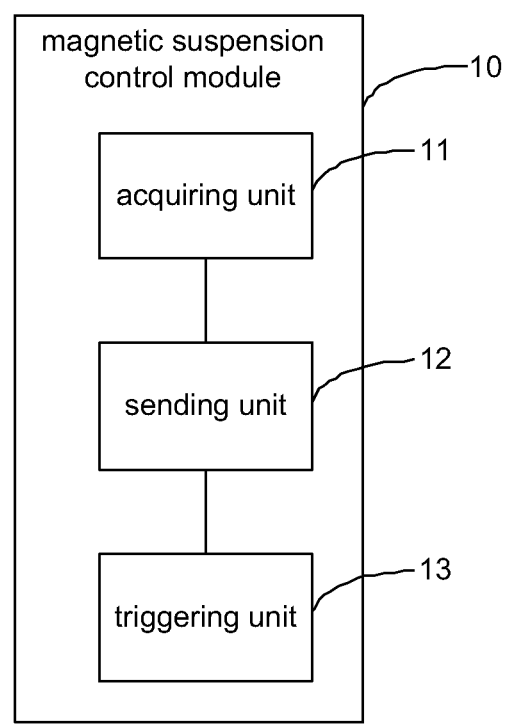
FIG. 3 is a schematic diagram of a structure of a magnetic suspension control module in a mobile terminal according to an embodiment of the disclosure.
Figure 4:
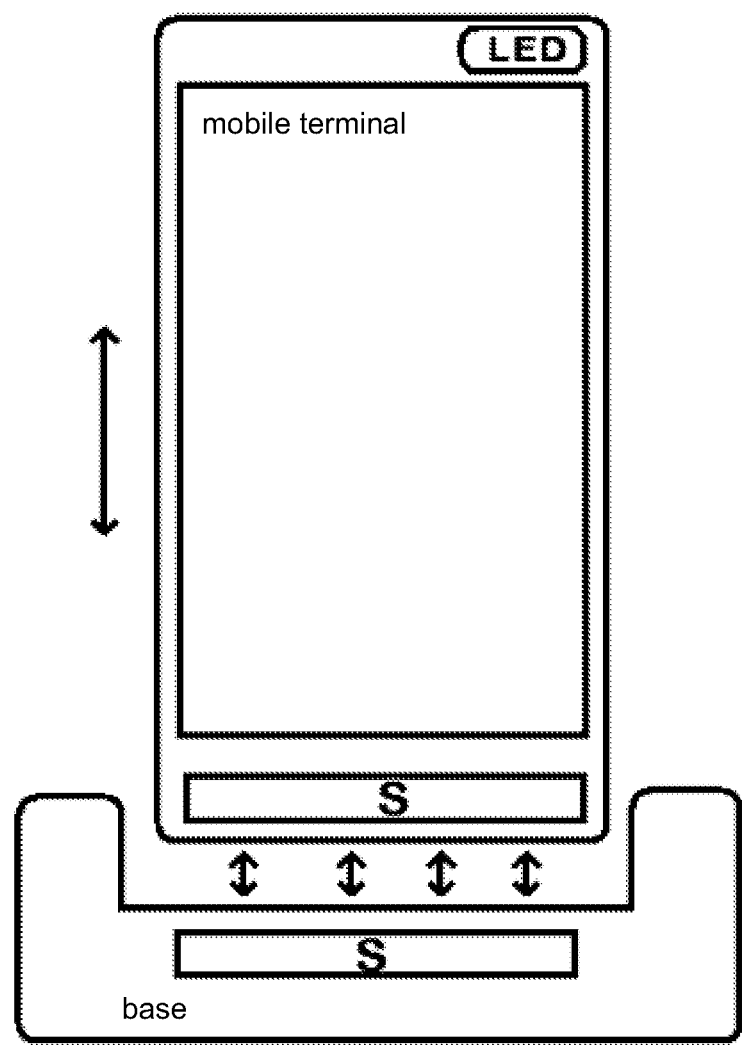
FIG. 4 may be a schematic diagram of suspension of a mobile terminal according to an embodiment of the disclosure.

Refer to FIG. 3, which shows a schematic diagram of a structure of the magnetic suspension control module 10 according to an embodiment. The magnetic suspension control module 10 may include units as follows.

An acquiring unit 11 may be for: when the preset triggering condition is met, acquiring a sampling frequency preset in the mobile terminal; and A sending unit 12 may be configured for: sending the first control signal to the first magnet 20, such that the first magnet 20 produces the polarity identical to the polarity of the second magnet 30, where a frequency of the first control signal is the sampling frequency.

A triggering unit 13 may be configured for: triggering an incoming call ringtone of the mobile terminal and/or flickering of an incoming call LED light of the mobile terminal.

The mobile terminal according to the embodiment works as follows.

When receiving no incoming call, the mobile terminal is placed in the base to stand on a desktop, in which case the mobile terminal combines with the base securely, as the polarity of the first magnet 20 is set to be opposite to that of the second magnet 30 at the base, and magnetic poles of opposite polarities attract each other.

When there is an incoming call, the acquiring unit 11 may acquire a locally preset sampling frequency, the sending unit 12 may produce a first control signal with a frequency identical to the sampling frequency to drive a Pulse Width Modulation (PWM) wave, and send the first control signal to the first magnet 20. The sampling frequency may be a sampling frequency of an incoming call ringtone of the mobile terminal or a flickering frequency of an incoming call LED light of the mobile terminal.

The first control signal may change the polarity of the first magnet 20, causing the mobile terminal to power the first magnet 20 such that the first magnet becomes an electromagnet with a polarity identical to that of the second magnet 30. Repulsion between magnetic poles of the same polarity will overcome the gravity of the mobile terminal, such that the mobile phone is held up and suspended.

The mobile terminal may adjust the magnetic strength of the first magnet 20 using the PWM signal by varying the difference between the gravity of the mobile terminal and a magnetic force with the frequency of the PWM signal, such that the mobile terminal floats up and down and dances. Meanwhile, the triggering unit 13 may further trigger an incoming call ringtone and/or rhythmic flickering of an incoming call LED light of the mobile terminal, such that the mobile terminal appears to dance with the music and the light.

After an incoming call ends, a sending unit 12 may send a second control signal to remove the electrode of the first magnet 20 and restore the original magnetic polarity of the first magnet opposite to the polarity at the base, such that the mobile terminal returns to the base correctly due to attraction between magnetic poles of opposite polarities.

Note that when the polarity of the second magnet 30 is not fixed, the mobile terminal has to detect the polarity of the second magnet 30 constantly to control the polarity of the first magnet 20 according to the polarity of the second magnet 30, such that the first magnet 20 has a polarity opposite to that of the second magnet 30 when the triggering condition is not met, and has a polarity identical to that of the second magnet 30 when the triggering condition is met, so as to achieve the dance.

The embodiment differs from a monotonic mode of prompting an incoming call by a ringtone, a vibration or a LED light in existing technology by increasing an interesting and personalized prompt by dance, thus achieving brand new user experience. With the embodiment, physical knowledge from different fields are combined; miniaturization and integration to a mobile terminal is achieved, which is an innovation comprehensively utilizing multiple disciplines. In addition, the base also serves for a feature of wireless charging of the mobile terminal, ensuring an endurance capability of the mobile terminal. The method is simple and easy to implement, and possesses great commercial values.

What described are merely embodiments of the disclosure, and are not intended to limit the scope of the disclosure. All equivalent structures or flow variations made using content of the specification and accompanying drawings of the disclosure, or direct or indirect application in another related technical field, likewise fall within the scope of the disclosure.

INDUSTRIAL APPLICABILITY

The disclosure integrates a high-tech maglev theory in an incoming call prompting application of a mobile terminal to replace a stereotyped monotonic prompt mode in a mobile terminal at present as an attempt to marry a physical theory and consumer electronics. A wireless charging feature is further covered via the base of the mobile terminal supporting the dance, ensuring the endurance capability of the mobile terminal. The disclosure stands for an application example of a perfect integration of the electromagnetic suspension theory in a mobile phone feature, bringing unprecedented user experience.

The invention claimed is:

1. A mobile terminal dance method, wherein a first magnet with a first magnetic pole is set at the bottom of a mobile terminal, the mobile terminal is placed in a base, and the base is set with a second magnet with a second magnetic pole facing the first magnetic pole, the second magnetic pole being of a polarity opposite to a polarity of the first magnetic pole, the method comprising a step of:

when a preset triggering condition is met, sending, by the mobile terminal, a first control signal to control the polarity of the first magnetic pole, such that the first magnetic pole produces a polarity identical to the polarity of the second magnetic pole, wherein the first magnet is an electromagnet, magnetic polarities of which are switched with an electrode change, wherein the step of when the preset triggering condition is met, sending, by the mobile terminal, the first control signal to control the polarity of the first magnetic pole, such that the first magnetic pole produces a polarity identical to the polarity of the second magnetic pole comprises steps of:

when the preset triggering condition is met, acquiring a sampling frequency preset in the mobile terminal; and sending the first control signal to the first magnet, such that the first magnetic pole produces the polarity identical to the polarity of the second magnetic pole, wherein a frequency of the first control signal is the sampling frequency, wherein the first control signal drives a Pulse Width Modulation (PWM) signal, and the method further comprises:

adjusting, by the mobile terminal, a magnetic strength of the first magnetic pole using the PWM signal to vary a difference between gravity of the mobile terminal and a magnetic force with a frequency of the PWM signal.

2. The method according to claim 1, wherein the sampling frequency is a sampling frequency of an incoming call ringtone of the mobile terminal or a flickering frequency of an incoming call LED light of the mobile terminal.

3. The method according to claim 2, further comprising a step of: while executing the step of sending, by the mobile terminal, the first control signal to control the polarity of the first magnetic pole, triggering an incoming call ringtone of the mobile terminal and/or flickering of an incoming call LED light of the mobile terminal.

4. The method according to claim 1, further comprising a step of: while executing the step of sending, by the mobile terminal, the first control signal to control the polarity of the first magnetic pole, triggering an incoming call ringtone of the mobile terminal and/or flickering of an incoming call LED light of the mobile terminal.

5. A mobile terminal, comprising a first magnet with a first magnetic pole set at the bottom of the mobile terminal and a magnetic suspension control module, wherein the mobile terminal is placed in a base, the base is set with a second magnet with a second magnetic pole facing the first magnetic pole, the second magnetic pole being of a polarity opposite to a polarity of the first magnetic pole, and the magnetic suspension control module is configured for:

when a preset triggering condition is met, sending a first control signal to control the polarity of the first magnetic pole, such that the first magnetic pole produces a polarity identical to the polarity of the second magnetic pole, wherein the first magnet is an electromagnet, magnetic polarities of which are switched with an electrode change, wherein the magnetic suspension control module comprises:

an acquiring unit configured for: when the preset triggering condition is met, acquiring a sampling frequency preset in the mobile terminal; and a sending unit configured for: sending the first control signal to the first magnetic pole, such that the first magnetic pole produces the polarity identical to the polarity of the second magnetic pole, wherein a frequency of the first control signal is the sampling frequency, wherein the first control signal drives a Pulse Width Modulation (PWM) signal, wherein the mobile terminal adjusts a magnetic strength of the first magnetic pole using the PWM signal to vary a difference between gravity of the mobile terminal and a magnetic force with a frequency of the PWM signal.

6. The mobile terminal according to claim 5, wherein the sampling frequency is a sampling frequency of an incoming call ringtone of the mobile terminal or a flickering frequency of an incoming call LED light of the mobile terminal.

7. The mobile terminal according to claim 6, wherein the magnetic suspension control module further comprises a triggering unit configured for: triggering an incoming call ringtone of the mobile terminal and/or flickering of an incoming call LED light of the mobile terminal.

8. The mobile terminal according to claim 5, wherein the magnetic suspension control module further comprises a triggering unit configured for: triggering an incoming call ringtone of the mobile terminal and/or flickering of an incoming call LED light of the mobile terminal.

* * * * *